United States Patent [19]
Shoebridge

[11] 3,917,307
[45] Nov. 4, 1975

[54] VEHICLE LEVELING AND STABILIZING SYSTEM

[75] Inventor: Harold P. Shoebridge, Escondido, Calif.

[73] Assignee: ATI Industries, Escondido, Calif.

[22] Filed: June 3, 1974

[21] Appl. No.: 475,949

[52] U.S. Cl............... 280/104; 280/6 H; 280/124 F
[51] Int. Cl.²......................................... B60G 11/26
[58] Field of Search...... 280/104, 124 F, 6 H, 43.23

[56] References Cited
UNITED STATES PATENTS
| | | | |
|---|---|---|---|
| 3,002,764 | 10/1961 | Clark | 280/104 |
| 3,752,497 | 8/1973 | Enke | 280/124 F |
| 3,836,161 | 9/1974 | Buhl | 280/6 H |

Primary Examiner—Philip Goodman
Attorney, Agent, or Firm—Brown & Martin

[57] ABSTRACT

A system for stabilizing a vehicle while moving and for providing a leveling action when parked, the system being particularly adaptable to campers, motor homes and similar coach type vehicles. The system utilizes four combined leveling and jack units between the wheel axles and the vehicle frame at four corner positions. The units are cross coupled in closed pair loops to provide stabilizing action against roll and away when the vehicle is moving. For leveling when parked, a common fluid pressure system energizes the units, and a valve control panel allows each unit to be adjusted and locked in the required position. All operations, including transition between leveling and stabilizing modes, are controlled from the driver accessible control panel. The system also permits variation of the vehicles ground clearance and aids in changing tires.

11 Claims, 6 Drawing Figures

VEHICLE LEVELING AND STABILIZING SYSTEM

BACKGROUND OF THE INVENTION

Recreational, camping and other coach type vehicles used off road, or in rough areas, often have special suspension aids to counteract sway, roll and other undulations. Such aids include additional or heavy duty shock absorbers, booster springs, torsion bars and the like. These types of aids stiffen the suspension but do not effectively compensate for a shift in the vehicle center of gravity due to swerving or leaning on uneven ground.

When a camping type vehicle is parked, as for an overnight stay, it is usual to brace or level the vehicle by means of jacks or other supports. These are normally manually operated screw jacks for telescopic posts, which require considerable time and effort to set up. Power jacks have been used but these are expensive and serve no other purpose.

SUMMARY OF THE INVENTION

The system described herein provides all the advantages of a stable ride under adverse conditions, plus rapid and precise vehicle leveling from a driver accessible internal control panel. In a typical installation, four hydraulic cylinder units are installed between the vehicle frame and the outer portions of the wheel axles, and the system is adaptable to most existing vehicles as an addition to the existing suspension. When the vehicle is in motion, the cylinder units are cross coupled in pairs in closed loops, so that a change in load on one unit of a pair causes a counteracting load in the other unit. This provides automatic stabilization by compensating for the shift of the vehicle center of gravity due to swerving or to oscillations over undulating or rough terrain, or from wind loads. The vehicle is thus stabilized under conditions which could cause dangerous or at least uncomfortable tilting action without the necessary compensation.

When the vehicle is parked, the cylinder units act as hydraulic jacks and are controlled individually or collectively from a control panel in the vehicle. A simple hydraulic pressure system provides power to raise or lower the vehicle at any or all of the cylinder units, to level the vehicle for safe and confortable occupation. Once set, the cylinder units can be locked to hold the position without further load on the hydraulic system.

The leveling mode can also be used to vary the ground or overhead clearance of the vehicle for negotiating obstacles and, in addition, the system can be used to aid in changing a tire by actuating the appropriate cylinder unit to raise the vehicle at the wheel affected. A jack or jack stand is then inserted under the vehicle and the cylinder unit reversed to raise the wheel from the gound, which avoids the necessity for jacking up a heavy vehicle.

The primary object of this invention, therefore, is to provide a new and improved vehicle leveling and stabilizing system.

Another object of this invention is to provide a vehicle leveling and stabilizing system utilizing hydraulic cylinder units which are combined uneven load compensators and jacks, auxiliary to the vehicle suspension.

Another object of this invention is to provide a new and improved vehicle leveling and stabilizing system having a single control panel in the vehicle for all modes of operation.

A further object of this invention is to provide a new and improved vehicle leveling and stabilzing system which is adaptable to many types of vehicles with a minimum of modification and without interfering with normal operation.

Other objects and many advantages of this invention will become more apparent upon a reading of the following detailed description and an examination of the drawings, wherein like reference numerals designate like parts throughout and in which.

DESCRIPTION OF THE PREFERRED EMBODIMENT

Figure 1:
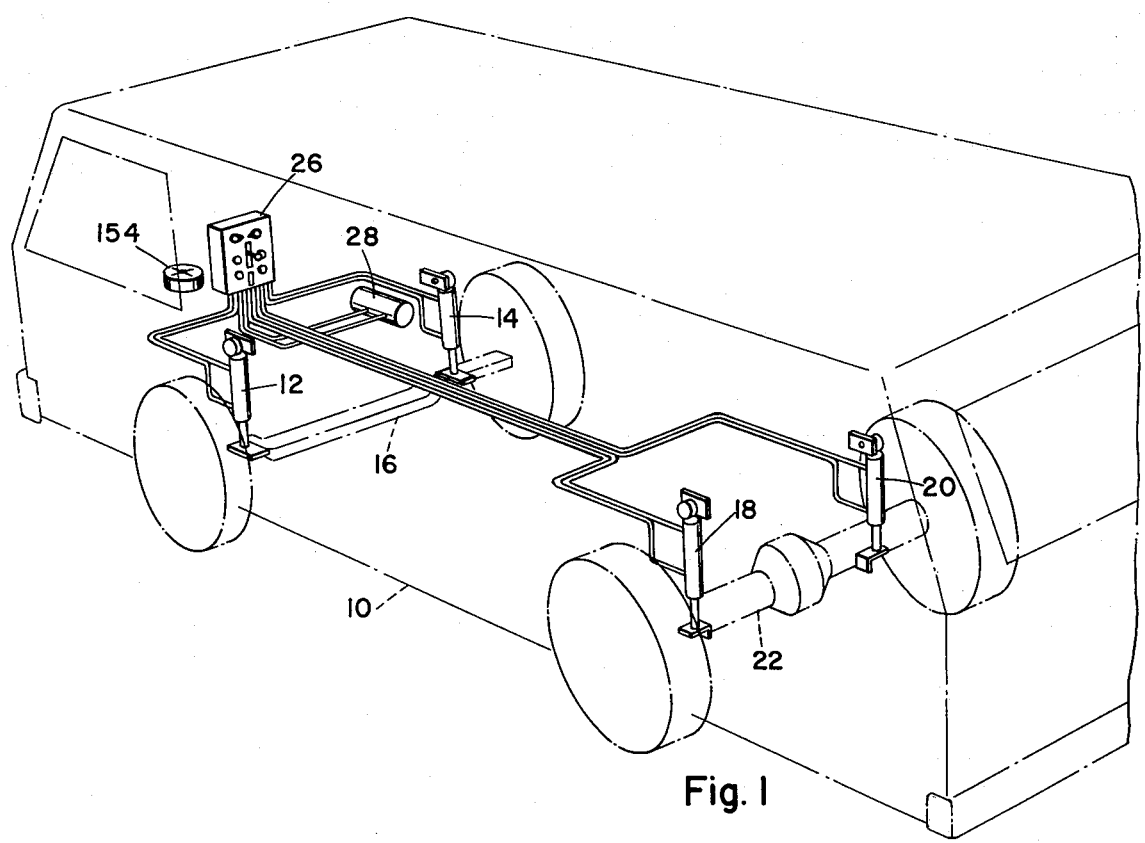
FIG. 1 is a diagram of the system with a typical vehicle indicated in outline.
Figure 2:
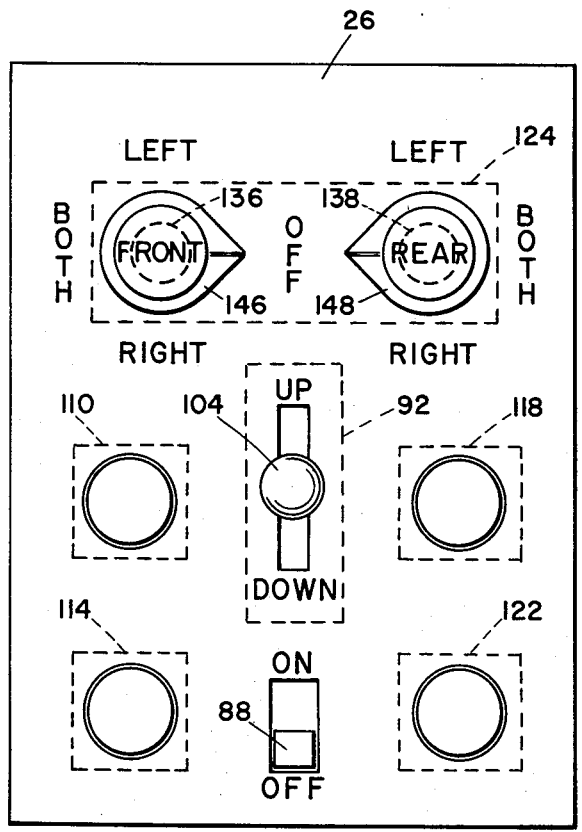
FIG. 2 is a front view of the control panel.
Figure 3:
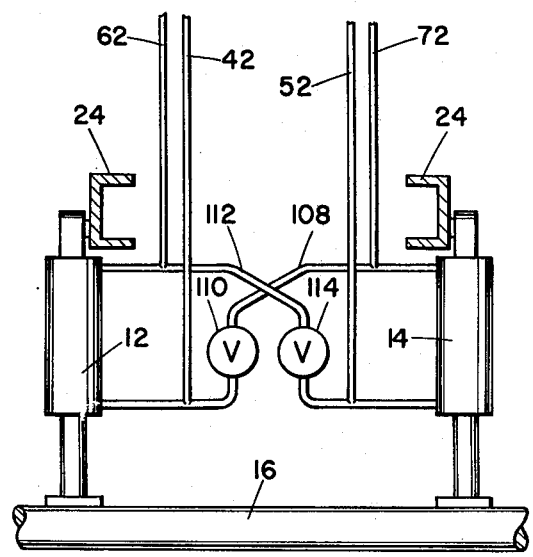
FIG. 3 is a diagram of the cross coupling of a pair of cylinder units in the stabilizing mode.

The basic system illustrated in FIG. 1 is installed in a vehicle 10, and includes a pair of double acting hydraulic cylinder units 12 and 14 at the front axle 16 and a pair of cylinder units 18 and 20 at the rear axle 22. With reference to FIG. 3, the cylinder units are connected between vehicle frame members 24 and the axles in any suitable manner, depending on the vehicle structure and suspension means. At the lower end, for example, connection could be made to the existing suspension brackets or mounting means. In the vehicle, preferably accessible to the driver, is a control panel 26, from which hydraulic connections extend to the cylinder units and to the hydraulic power unit 28.

Figure 4:
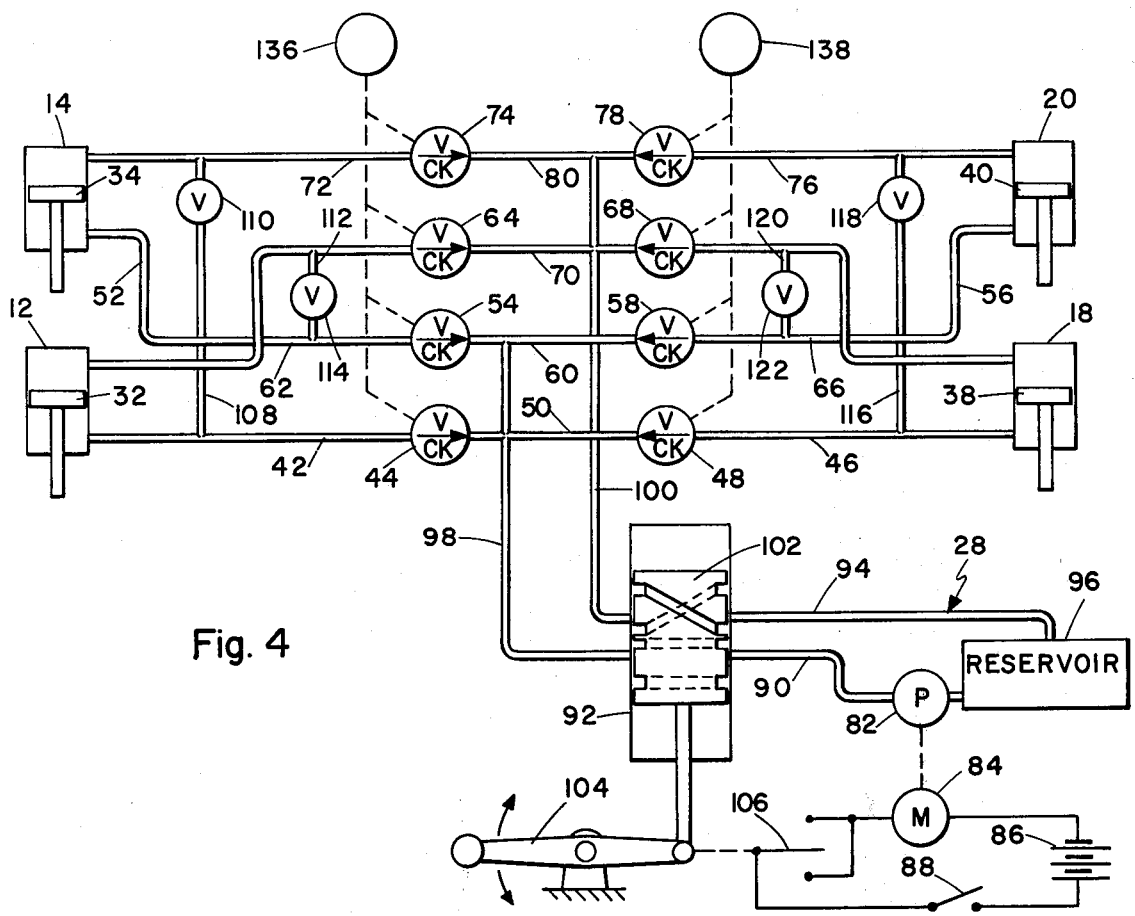
FIG. 4 is a diagram of the complete hydraulic system in basic form.

In the hydraulic system illustrated in FIG. 4, cylinder units 12, 14, 18, and 20 respectively have pistons 32, 34, 38, and 40. The lower end of cylinder unit 12 is coupled by a hydraulic line 42 to a check valve 44 and the lower end of cylinder unit 18 is connected by line 46 to a check valve 48. Check valves 44 and 48 are coupled by a common connect or 50. The lower end of cylinder unit 14 is connected by line 52 to a check valve 54 and the lower end of cylinder unit 20 is connected by line 56 to a check valve 58. Check valves 54 and 58 are coupled by a common connector 60. The upper end of cylinder unit 12 is connected by line 62 to a check valve 64 and the upper end of cylinder unit 18 is connected by line 66 to a check valve 68. Check valves s64 and 68 are coupled by a common connector 70. The upper end of cylinder unit 14 is connected by line 72 to a check valve 74 and the upper end of cylinder unit 20 is connected by line 76 to a check valve 78. Check valves 74 and 78 are coupled by a common connector 80.

Power unit 28 includes a hydraulic pump 82 driven by a motor 84, which is energized by the vehicle battery 86, or other power source, through a switch 88 mounted on control panel 26. Pump 82 has a pressure supply line 90 leading to a selector valve 92, and a return line 94 leads from the control valve to a reservoir 96 and back to the pump. From the selector valve 92 a delivery line 98 is coupled to both common connectors 50 and 60, and another delivery line 100 is coupled to common connectors 70 and 80. In the selector valve is a spool 102, which in one position connects supply line 90 to delivery line 98, and in another position connects the supply line to delivery line 100, the type being well known. Thus the hydraulic pressure can be applied selectively to the upper or lower ends of the cylinder units through one delivery line, with return flow from the other ends through the other delivery line. Spool 102 is operated by a lever 104 which projects from control panel 28. The lever 104 is also coupled to a switch 106 in series with switch 88, to operate motor 84 only when hydraulic power is required.

To provide the stabilizing action of the system, lines 42 and 72 are interconnected by a cross line 108 through a shut off valve 110. Lines 52 and 62 are interconnected by a cross line 112 through a shut off valve 114. Similarly, lines 46 and 76 are interconnected by a cross line 116 through a shut off valve 118, and lines 56 and 66 are interconnected by a cross line 120 through a shut off valve 122. The shut off valves are conveniently mounted on control panel 28.

The lower end of cylinder unit 12 is thus coupled through valve 110 to the upper end of cylinder unit 14, and the lower end of cylinder unit 14, and the lower end of cylinder unit 14 is coupled through valve 114 to the upper end of cylinder unit 12, as also indicated in FIG. 3. The rear pair of cylinders 18 and 20 are similarly cross connected.

The eight ball type check valves are contained in a valve block 124 which is mounted on control panel 28. Four check valves are on each side of block 124, each valve being actuated by a plunger 126 projecting from the side of the block. The central core 128 of the valve block contains four cylindrical chambers, which actually comprise the common connectors 50, 60, 70, and 80, interconnecting the pairs of check valves as described. In each of the chambers is a compression spring 130, having cup members 132 at opposite ends in which the ball check valves are seated, each spring holding one pair of check valves normally closed. The specific structure can vary from that illustrated according to accepted valve design practice.

Figure 5:
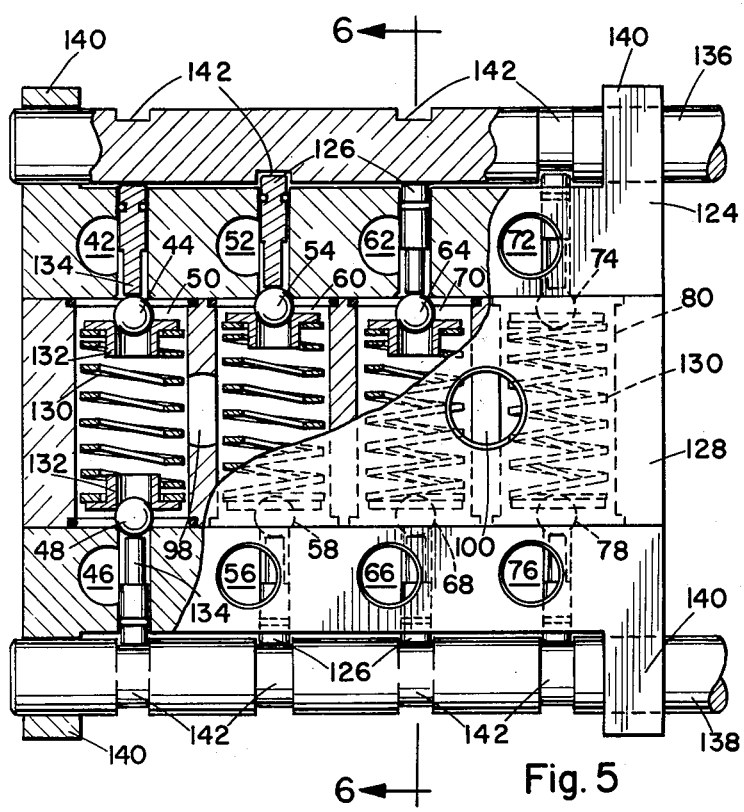
FIG. 5 is a bottom plan view of the leveling control valve unit, partially cut away.
Figure 6:
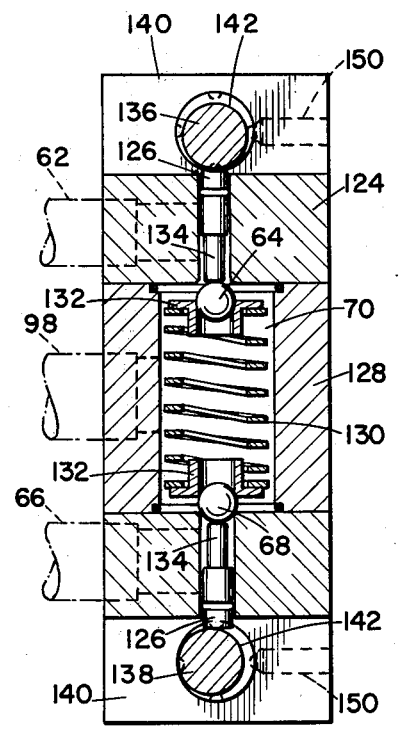
FIG. 6 is a sectional view taken on line 6—6 of FIG. 5.

The various lines from the cylinder units enter the valve block at their respective check valve positions and are correspondingly numbered in FIG. 5. Each plunger 126 has a reduced diameter portion 134 to provide passage for hydraulic fluid between each line and its associated common connector chamber. Delivery line 98 enters the central core 128 and communicates with common connector chambers 50 and 60, while delivery line 100 similarly communicates with chambers 70 and 80. Any suitable standard types of hydraulic fittings and couplings may be used at the various connections.

The check valves are operated by a pair of cam shafts 136 and 138, which are rotatable in bearing extensions 140 on opposite sides of the valve block 124. Each cam shaft has cam portions 142 which engage the individual valve plungers 126, the cam portions being arranged so that the check valves can be actuated in pairs or collectively on each side. As illustrated, cam shaft 136 actuates the check valves for the front cylinder units 12 and 14 and cam shaft 138 controls rear cylinder units 18 and 20. The cam shafts 136 and 138 protrude through the control panel 28 and are fitted with suitable labelled control knobs 146 and 148, respectively. Indexing detents 150 are installed in the valve block 124 to index the cam shafts at positions for left, right or both cylinder units together of each pair, as indicated on the control panel. In the OFF position of the control knobs the check valves are all closed. Damage to the system from excess pressure due to extreme loads or high temperatures is prevented by pressure relief through the check valves, when the pressure is sufficient to overcome springs 130.

For stabilizing action when the vehicle is in motion the system is placed in the self-stabilizing mode. This is accomplished, with shsut off valves 110, 114, 118 and 122 initially closed, by turning switch 88 on, turning knobs 146 and 148 to BOTH and moving lever 104 to DOWN. All cylinder units are thus retracted and the vehicle is pulled down against the existing suspension springs. Fluid in the lower portions of the cylinder units is displaced by the volume of the piston rods. Knobs 146 and 148 and the switch 88 are then turned to OFF and all shut off valves 110, 114, 118, 122 are opened to cross connect the cylinders. The vehicle suspension springs will then raise the vehicle to its normal level but, since the check valves are closed, fluid can not re-enter the cylinder units and the units are short of fluid in the amount of the volume of the piston rods. This provides controlled cavitation and avoids an unnecessarily hard ride caused by a fluid locked system.

With all the check valves closed, the only fluid flow is between the cross connected cylinders in each pair. With reference to FIGS. 3 and 4, a downward load on cylinder unit 12 will force pressure from its upper end, through valve 114 to the lower end of cylinder unit 14. This will force piston 34 upwardly, causing the vehicle frame to be pulled down and counteract the rolling effect of the downward load on the other side. A reverse load will cause the opposite action by pressure transfer through valve 110. The cross coupled cylinders 18 and 20 operated in a similar manner to compensate for offset loads due to swerving, sharp turns, cross winds and the like.

When the vehicle is parked for any length of time, as for overnight camping, it is a simple matter to level the vehicle. This is particularly desirable when using appliances for cooking and the like. Any suitable means, such as a bubble indicator 154, may be used to determine the attitude of the vehicle. For leveling the valves 110, 114, 118, and 122 are closed, so that there is no cross connection between cylinders.

If one corner of the vehicle must be adjusted, the appropriate knob 146 or 148 is turned to the required position. With switch 88 ON, the lever 104 is moved to the UP or DOWN position, as necessary, which starts the power unit 28 through switch 106 and cause hydraulic pressure to be applied to the selected cylinder unit. If the vehicle is facing downhill, both front cylinder units 12 and 14 are selected by knob 146 and lever 104 moved to the UP position until the front end is raised as required. It will be obvious that the vehicle can be leveled very quickly from the control panel. When knobs 146 and 148 are turned to the OFF position, all the check valves are closed and the cylinder units are locked in the set positions with the vehicle level.

The system can also be used to vary the ground clearance of the vehicle. On a smooth road a low center of gravity is desirable for stability, but added clearance may be needed to clear rocks and other obstacles in rough terrain. To increase ground clearance, shut off valves 110, 114, 118 and 122 are closed, knobs 146 and 148 are turned to the BOTH position and lever 104 is moved to UP. This applies hydraulic pressure to the upper ends of all cylinder units and lifts the vehicle. An opposite action may be used to lower the vehicle to pass under a low bridge or other overhanging obstacle.

Other uses include raising to rear of the vehicle to facilitate backing out of a steep driveway without scraping the underside. The system may also be used to facilitate changing a tire or for servicing under the vehicle. To change a tire the cylinder unit at the particular wheel is actuated to raise the vehicle frame. A jack stand or other suitable support is then placed under the vehicle to support the load. The cylinder unit is then reversed to raise the affected wheel clear of the ground and permit easy removal and replacement. The vehicle is lowered to the ground by reversing the procedure. For servicing, either end or the entire vehicle may be jacked up by actuating one or both pairs of cylinder units.

On extremely rough surfaces, such as in off road travel, it may be desirable to lock out the self-stabilizing action, since constant overcorrection could cause a stiff ride. This is accomplished by turning shut off valves 110, 114, 118, and 122 OFF, with switch 88 OFF, and moving lever 104 to the DOWN position. The lever is then held in the DOWN position by any suitable means, not shown. A rod between the knobs of valves 110 and 118, passing above lever 104, will serve the purposes, or a simple retaining device may be mounted on panel 26.

The system makes a very versatile installation in a coach type vehicle and is particularly effective in heavy campers and the like, which are cumbersome to handle with manually operable means. The system does not interfere with normal operation of the vehicle, yet handling is improved and operation made safer.

Having described my invention, I claim:

1. A vehicle leveling and stabilizing system for installation in a vehicle having front and rear wheel axles and a frame supported above the axles, the system comprising:
    a front pair of double acting hydraulic cylinder units connected between the frame and the end portions of the front axle;
    a rear pair of double acting hydraulic cylinder units connected between the frame and the end portions of the rear axle;
    fluid conducting means connecting the upper end of each cylinder unit in a pair to the lower end of the other cylinder unit in the pair in cross connected closed loops;
    shut off means for selectively shutting off the closed loop connections;
    a hydraulic power unit having pressure supply means connected to the upper and lower ends of each of said cylinder units;
    and control means for applying pressure from said power unit to the upper and lower ends of each cylinder unit selectively.

2. The system of claim 1, wherein each cross connected closed loop has individual shut off means.

3. The system of claim 1, wherein said power unit has one delivery line connected to the upper ends of all the cylinder units, and another delivery line connected to the lower ends of all the cylinder units;
    said control means including a selector valve for directing pressure from the power unit to each delivery line selectively.

4. A vehicle leveling and stabilizing system for installation in a vehicle having front and rear wheel axles and a frame suported above the axles, the system comprising:
    a front pair of double acting hydraulic cylinder units connected between the frame and the end portions of the front axle;
    a rear pair of double acting hydraulic cylinder units connected between the frame and the end portions of the rear axle;
    fluid conducting means connecting the upper end of each cylinder unit in a pair to the lower end of the other cylinder unit in the pair in cross connection closed loops;
    shut off means for selectively shutting off the closed loop connections;
    a hydraulic power unit having one pressure supply delivery line connected to the upper ends of all the cylinder units, and another delivery line connected to the lower ends of all the cylinder units;
    control means including a selector valve for directing pressure from the power unit to each delivery line selectively;
    and a check valve between each cylinder unit and the respective delivery line.

5. The system of claim 4, and including actuating means for actuating said check valves individually and collectively.

6. The system of claim 4, and including a valve block in which said check valves are contained each check valve being connected between one end of a cylinder unit and the respective delivery line;
    and actuating means on the valve block for actuating said check valves selectively.

7. The system of claim 6, wherein each of said check valves has an actuating plunger extending fron the valve block;
    said actuating means comprising cam shafts having cam portions engaging the plungers.

8. The system of claim 7, wherein said check valves are spaced along opposite sides of the valve block;
    the valve block having connecting chambers therein interconnecting related pairs of check valves;
    and spring means in each of said chambers holding the related pairs of check valves normally closed.

9. The system of claim 8, wherein said delivery lines are connected to the associated connecting chambers for the cylinder units interrelated to the pressure supply.

10. The system of claim 4, wherein said power unit has a motor driven pump;
    said selector valve having a switch connected thereto for actuating said pump only when the selector valve is operated.

11. In a vehicle having a spring suspension system and pairs of double acting hydraulic cylinder units connected between the frame and the opposite ends of the front and rear axles, a source of hydraulic fluid pressure with means for selective connection to opposite ends of each cylinder unit, and fluid interconnections between opposite ends of cylinder units in each pair front and rear, the method of establishing a self-stabilizing action between the cylinder units comprising:
    closing the interconnections between the pairs of cylinder units;
    actuating the source of fluid pressure to operate the cylinder units and pull the vehicle down against the spring suspension;
    shutting off the source of fluid pressure from the cylinder units;

and opening the interconnections between the pairs of cylinder units.

* * * * *